(12) United States Patent
Xie et al.

(10) Patent No.: US 10,500,650 B2
(45) Date of Patent: Dec. 10, 2019

(54) POSITIONING DEVICE FOR DRILLING (71) Applicant: BOE TECHNOLOGY GROUP CO., LTD., Beijing (CN)

(72) Inventors: Jiabin Xie, Beijing (CN); Zailin Hong, Beijing (CN); Xiaoguang Hong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/919,351

(22) Filed: Mar. 13, 2018

(65) Prior Publication Data

US 2019/0091774 A1 Mar. 28, 2019

(30) Foreign Application Priority Data

Sep. 26, 2017 (CN) ..................... 2017 2 1242890 U (51) Int. Cl.
*B23B 47/28* (2006.01)
(52) U.S. Cl.
CPC ........ *B23B 47/287* (2013.01); *B23B 2247/12* (2013.01); *B23B 2260/004* (2013.01); *B23B 2260/07* (2013.01); *B23B 2270/16* (2013.01)
(58) Field of Classification Search
CPC ... B23B 47/287; B23B 47/28; B23B 2247/12; B23B 2260/004; B23B 2260/07; B23B 2260/12; B23B 2270/16
See application file for complete search history.

(56) References Cited

U.S. PATENT DOCUMENTS

| 575,469 | A | * | 1/1897 | Fancher | ................... | B23B 47/28 |
| | | | | | | 408/115 R |
| 2,373,918 | A | * | 4/1945 | Schoeniger | ............. | B23B 47/28 |
| | | | | | | 408/104 |
| 4,981,400 | A | * | 1/1991 | Stover | ................... | B23B 47/287 |
| | | | | | | 33/667 |
| 2009/0279968 | A1 | * | 11/2009 | Kiezel | ................... | B23B 47/288 |
| | | | | | | 408/108 |

FOREIGN PATENT DOCUMENTS

| CN | 103658744 | A | | 3/2014 | | |
| CN | 104353872 | A | | 2/2015 | | |
| DE | 19822617 | A1 | * | 11/1999 | ........... | B23B 47/287 |
| GB | 1399098 | A | * | 6/1975 | ........... | B23B 47/287 |

* cited by examiner

*Primary Examiner* — Alan Snyder
(74) *Attorney, Agent, or Firm* — Calfee, Halter & Griswold LLP (57) ABSTRACT

A positioning device for drilling including a positioning base which is provided with a positioning through hole, and a plurality of clamping assemblies which are provided on the positioning base and circumferentially spaced round a central axis a, as center, of the positioning through hole. Each of the clamping assemblies includes an abutting part having an adjustable distance from a central axis of the positioning through hole.

17 Claims, 6 Drawing Sheets

POSITIONING DEVICE FOR DRILLING

CROSS REFERENCE

This application is based upon and claims priority to Chinese Patent Application No. 201721242890.2, filed on Sep. 26, 2017, the entire contents thereof are incorporated herein by reference.

TECHNICAL FIELD

The disclosure relates to the technical field of machining, in particular to a positioning device for drilling.

BACKGROUND

In industrial production, it is often needed to make a variety of holes in workpieces. Drill bits are usually used for making holes of relatively small diameters, in which case it has to be considered how to position the drill bits in order to accurately determine the positions of the holes.

There are currently three typical drilling ways. One is the use of numerically controlled machine tools for drilling, by which drill bits are positioned. Another way is to position the drill bits by jigs which are specially designed and fabricated for different workpieces. A still another way is to make proofs and puncture a hole, to scribe a workpiece by a scribing tool to locate the center of circle of the hole, to punch a small dot at the center of circle, and to position a drill bit by the small dot.

Both ways involving numerically controlled machine tools, which are expensive, and jigs, which have complicated structures and are expensive for design and fabrication, are only adapted for mass production, but not for small scale production. The third way, though suitable for small scale production, is done manually, having low efficiency and high labor intensity.

SUMMARY

The disclosure provides a positioning device for drilling, which includes a positioning base provided with a positioning through hole, and a plurality of clamping assemblies provided on the positioning base and circumferentially spaced round a central axis, as center, of the positioning through hole. Each of the clamping assemblies includes an abutting part. A distance between the abutting part and the central axis of the positioning through hole is adjustable.

In an embodiment of the disclosure, each of the clamping assemblies may include a telescopic bar which has one end provided at the positioning base, and another end on which the abutting part is provided.

In an embodiment of the disclosure, the positioning device for drilling may further include at least one interconnecting mechanism each of which drivingly connects the telescopic bars of at least two clamping assemblies of the plurality of clamping assemblies such that the telescopic bars of the at least two clamping assemblies are able to extend or retract synchronously.

In an embodiment of the disclosure, each of the interconnecting mechanisms may include an interconnecting gear which is rotatably provided at the positioning base. The telescopic bars drivingly connected with the interconnecting mechanisms are provided thereon with racks extending along respective extending-retracting directions, with which the interconnecting gears are engaged.

In an embodiment of the disclosure, the positioning device for drilling may include a plurality of interconnecting mechanisms each of which includes one interconnecting gear. All of the interconnecting gears of the respective interconnecting mechanisms are arranged on a same axis.

In an embodiment of the disclosure, the positioning device for drilling may include N interconnecting gears each of which is engaged with the racks of the telescopic bars of two of the clamping assemblies and in the same direction as the extending-retracting direction of the telescopic bars of the two clamping assemblies driving connected with same one of the interconnecting gears. The included angle between extending-retracting directions of telescoping bars of any two adjacent ones of the clamping assemblies is 180°/N, where N is a positive integer.

In an embodiment of the disclosure, the interconnecting gears may be installed on the positioning base by a gear shaft which is provided to be coaxial with the positioning through hole. The positioning through hole runs through the gear shaft.

Furthermore, the interconnecting gears may be moveably connected with the gear shaft.

In an embodiment, the positioning device may further include a locking mechanism for locking a plurality of telescopic bars.

In an embodiment of the disclosure, the locking mechanism may include a locking nut which is threadedly connected with the gear shaft, and a stop collar which is co-axially securely connected to the gear shaft. The interconnecting gear is positioned between the locking nut and the stop collar.

In an embodiment of the disclosure, the locking nut may include a nut body which is fitted around the gear shaft, and a pushing bar which is provided on the nut body.

In an embodiment of the disclosure, in the extending direction of the central axis, the abutting parts of the clamping assemblies each are disposed at same side of the positioning base.

In an embodiment of the disclosure, the abutting parts of the plurality of clamping assemblies may all be in same one plane.

In an embodiment of the disclosure, the abutting part may include an abutting bar provided to be parallel with and spaced from the telescoping bar, and be provided, by way of an installing base, at an end of the telescoping bar away from the positioning base. A portion of the abutting bar between the installing base and the positioning base is adjustable in length.

In an embodiment of the disclosure, the positioning device for drilling may also include a plurality of positioning sleeves, which have different inner diameters, and outer diameters all equal to the diameter of the positioning through hole.

BRIEF DESCRIPTION OF THE DRAWINGS

Now brief description of the drawings as required for describing embodiments of the disclosure will be made in order to explain more clearly the technical solutions of the embodiments. Apparently, the drawings in the following description only involve some embodiments of the disclosure, and it will be apparent to those skilled in the art that other drawings will be gained from therefrom without creative efforts.

DETAILED DESCRIPTION

Now embodiments of the disclosure will be described in detail with reference to the drawings in order to make the disclosure more clear in terms of objectives, technical solutions and advantages.

Figure 1:
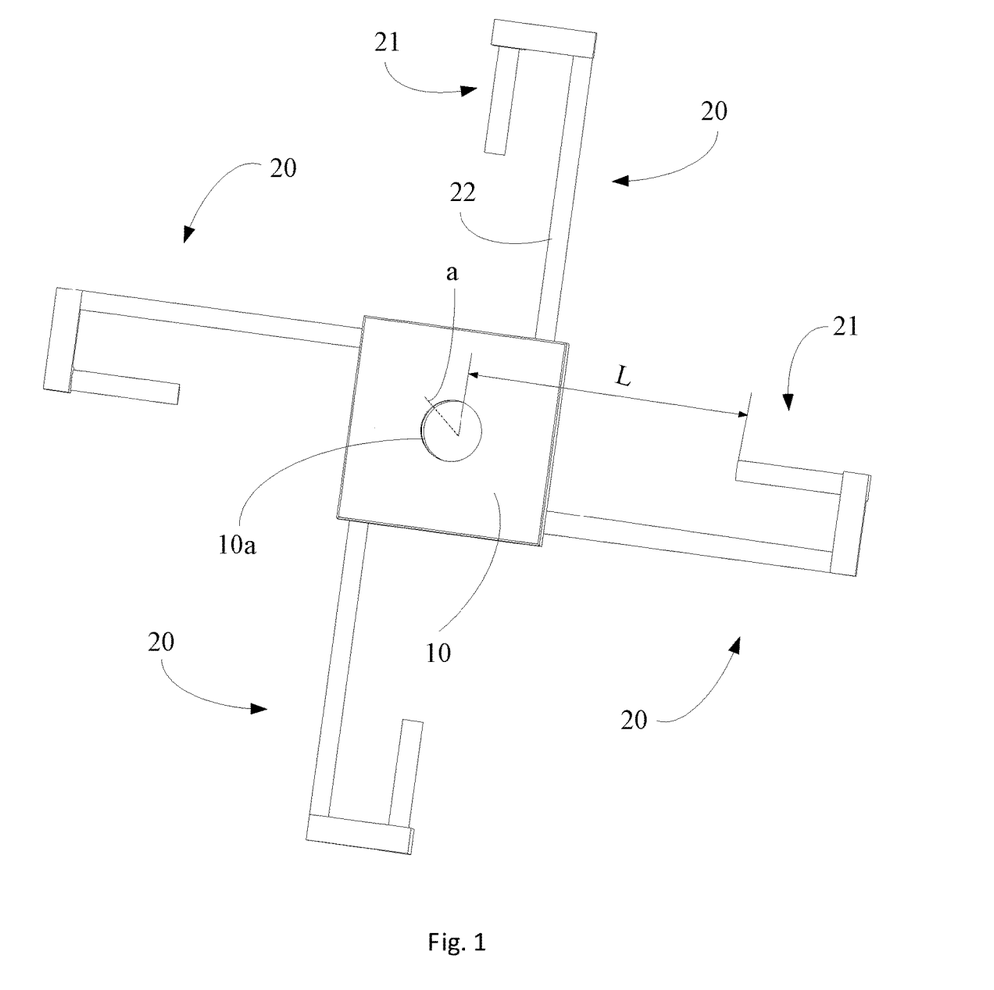
FIG. 1 is a structural view of a positioning device for drilling according to an embodiment of the disclosure.

FIG. 1 is a structural view of a positioning device for drilling according to an embodiment of the disclosure. As shown in FIG. 1, the positioning device for drilling includes a positioning base 10 which is provided with a positioning through hole 10a, and a plurality of clamping assemblies 20 which are provided on the positioning base 10 and circumferentially spaced round a central axis a, as center, of the positioning through hole 10a. Each of the clamping assemblies 20 includes an abutting part 21. The distance L between the abutting part 21 and the central axis of the positioning through hole 10a is adjustable.

According to the technical solution as presented by the embodiment of the disclosure, when drilling, a workpiece may be firstly clamped by a general-purpose jig, such as a chuck, and the positioning base is placed on the workpiece and is fixed on a surface of the workpiece by the plurality of clamping assemblies. Since each of the clamping assemblies has an abutting part, and the distance between the abutting part and the central axis of the positioning through hole is adjustable, once the abutting parts of the plurality of clamping assemblies all abut against the surface of the workpiece, by adjusting the distances between the abutting parts and the central axis of the positioning through hole, the positioning through hole will be aligned with and fixed with respect to the surface of the workpiece, whereby drilling may performed in the workpiece at the positioning through hole. The positioning device for drilling has a simple structure and may be easily fabricated, is suitable for small scale production, may be easily operated, and improves machining efficiency.

Figure 2:
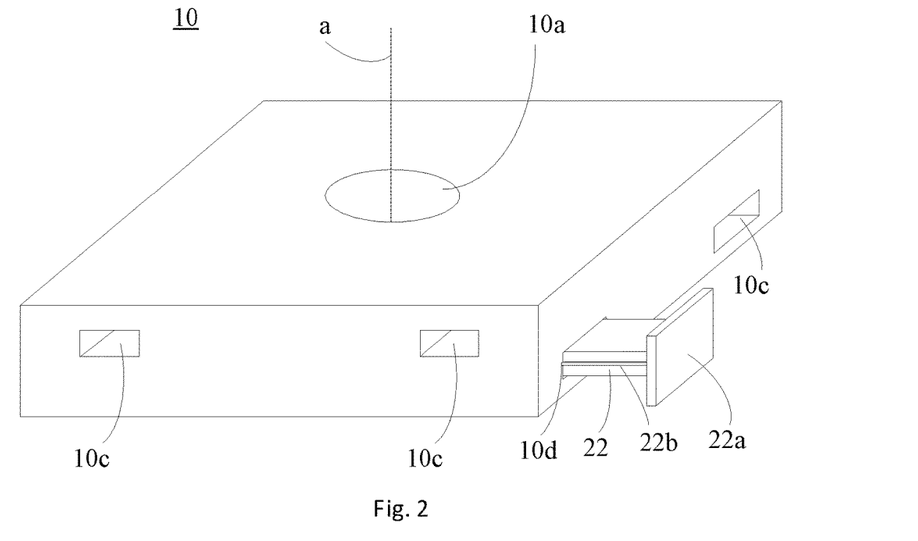
FIG. 2 is a schematic structural view of a positioning base of a positioning device for drilling according to an embodiment of the disclosure.

FIG. 2 is a schematic structural view of a positioning base of a positioning device for drilling according to an embodiment of the disclosure. As shown in FIG. 2, the positioning base 10 may be in form of rectangular parallelepiped, having a structure either of hollow box or of solid block. The disclosure, however, is not limited thereto. The central axis a of the positioning through hole 10a may be perpendicular to the opposing two surfaces of the positioning base 10. In other embodiments of the disclosure, the positioning base 10 may also have, but not limited to, other shapes such as triangular prism, pentagonal prism, circular cylinder.

In addition, the positioning base 10 may have a convex or concave surface which is to be placed on the workpiece, which facilitates drilling in a workpiece having a non-planer surface. The concave or convex surface may be shaped in accordance with the shape of the surface of the workpiece to be drilled such that the convex or concave surface may fit to the workpiece.

In the extending direction of the central axis a, the abutting parts 21 of the clamping assemblies 20 each are disposed at the same side of the positioning base 10. For most workpieces, the positioning base 10 may be installed thereon only if the abutting parts 21 of the clamping assemblies 20 are disposed at the same side of the positioning base 10. For workpieces of certain shapes, it is also possible to place the abutting parts 21 at two sides of the positioning base 10, respectively, such that the positioning base 10 may be securely installed on the workpieces. The positions of the abutting parts 21 may be determined based on the particular shapes of the workpieces.

Figure 3:
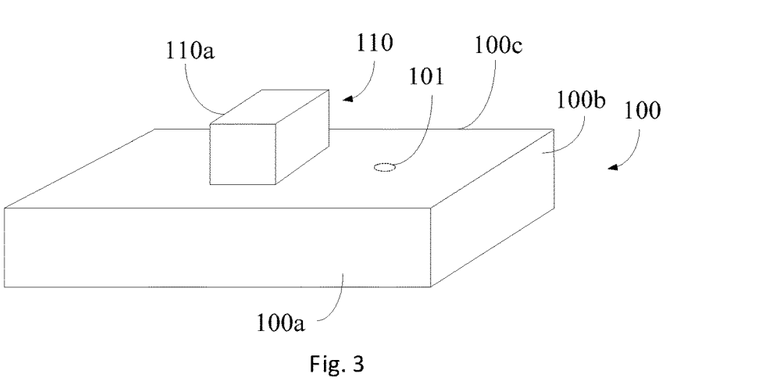
FIG. 3 is a structural view of a workpiece to be drilled.

Take a workpiece as shown in FIG. 3 as an example. The workpiece 100 is in form of rectangular parallelepiped, and has one surface on which a boss is provided and has a hole 101 to be drilled. If the workpiece 100 is drilled, a positioning device for drilling may be used with the abutting parts at either side of the positioning base. When drilling, part of the abutting parts may abut against the side walls 100a, 100b and 100c of the workpiece, and another part of the abutting parts may abut against the side wall 110a of the boss 110.

Each of the clamping assemblies 20 may include a telescopic bar 22 which has one end provided at the positioning base 10, and another end on which an abutting part 21 is provided. Accordingly, the distance of the abutting part 21 from the positioning base 10 may be changed by adjusting the length of the telescopic bar 22 in order to install the positioning base 10 onto workpieces of various different sizes or shapes, whereby the positioning device for drilling may be suitable for many more workpieces.

The telescopic bars 22 may be bar members with adjustable length. Exemplarily, in an embodiment of the disclosure, the telescopic bars may alternatively be bars inserted into the positioning base 10. In particular, the positioning base 10 may be provided with a plurality of installing holes 10c corresponding to the telescopic bars 22 one by one and extending in the same direction as the extending-retracting directions of the telescopic bars 22 inserted therein, such that the distances of the abutting parts 21 from the positioning base 10 may be adjusted by changing the length of the telescopic bars 22 beyond the installing holes 10c.

Here, the installing holes 10c may be either through holes running through the positioning base or blind holes not running through the positioning base. The telescopic bars 22 may have a larger length adjustment range when the installing holes 10c are through holes.

When the installing holes 10c are through holes, both ends of the telescopic bars 22 may be positioned outside the installing holes 10c. Each of the telescopic bars may be provided with the abutting part 21 at one end and a stop 22a at the other end to prevent the telescopic bars 22 from separating out of the installing holes 10c.

Alternatively, guiding features may be provided correspondingly on the telescopic bars 22 and the positioning base 10.

For example, there are provided with ribs 22b on the telescopic bars 22, and grooves 10d corresponding to the ribs 22b on the walls of the installing holes 10c. The ribs and the grooves may serve as guides, allowing extension and retraction of the telescopic bars 22 to be more stable.

The telescopic bars may alternatively be provided with grooves while the ribs may be provided on the walls of the installing holes 10c.

Figure 4:
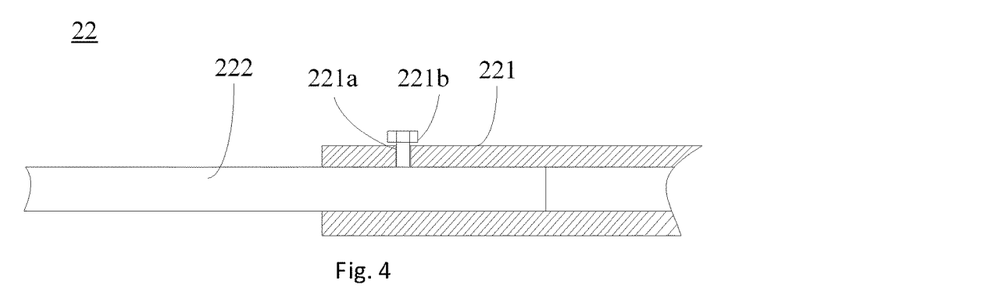
FIG. 4 is a schematic structural view of a telescopic bar according to an embodiment of the disclosure.

FIG. 4 is a schematic structural view of a telescopic bar according to an embodiment of the disclosure. As shown in FIG. 4, the telescopic bar 22 may include a sleeve 221 which may be securely installed in the positioning base 10, and an adjusting bar 222 which is inserted coaxially in the sleeve 222. The abutting part 21 may be provided at the end of the adjusting bar 222 beyond the sleeve 221 such that the distance of the abutting part 21 from the positioning base 10 may be changed by changing the length of the adjusting bar 222 beyond the sleeve 221, facilitating abutment of the abutting part 21 against the surface of the workpiece.

In an embodiment, the positioning device may further include a locking mechanism for locking a plurality of telescopic bars, which may including a locking hole 221a and a locking screw 221b. In particular, each sleeve 221 may have its wall provided with the locking hole 221a which is inner-threadedly engaged with the locking screw 221b. Accordingly, the adjusting bar 222 may be clamped by screwing up the locking screw 221b after adjusting the position of the adjusting bar 222, and is fixed relative to the sleeve 221, such that the positioning base 10 may be fixed on the workpiece more stably and securely to prevent the abutting part from being loosened due to vibration and the like during drilling.

In other embodiments of the disclosure, the adjusting bar 222 may be alternatively fixed on the positioning base 10 while the abutting part 21 may be provided at the sleeve 221. The length of the telescopic bar 22 may be changed by adjusting the adjusting sleeve 221.

It should be noted that in the embodiment as shown in FIG. 1, the positioning device may also include a locking mechanism for locking a plurality of telescopic bars, which is similar in structure to the locking mechanism for the positioning device as shown in FIG. 4, and also includes a locking hole and a locking screw, except that in the current embodiment, the locking hole is provided in the positioning base and communicates with the installing hole. The telescopic bar 22 is abutted against the hole wall of the installing hole 10c by screwing up the locking screw after adjustment of the position of the telescopic bar, which similarly may prevent the abutting part 21 from be loosened due to vibration and the like during drilling.

The positioning device for drilling as shown in FIG. 1 may further include an interconnecting mechanism which drivingly connects the telescopic bars 22 of two clamping assemblies 20 of the plurality of clamping assemblies 20 such that the telescopic bars 22 of two clamping assemblies may extend or retract synchronously. This may facilitate simultaneous abutment of the abutting parts 21 of two telescopic bars against the surface of the workpiece, and enable easier use of the positioning device for drilling. Moreover, with the interconnecting mechanism, one locking mechanism may be shared between mutually drivingly connected telescopic bars 22. Once one of the telescopic bars 22 is locked by the locking mechanism, other telescopic bars interconnected therewith is also locked, which simplifies the structure of the positioning device for drilling.

Furthermore, the interconnecting mechanism may also drivingly connect a plurality of telescopic bars 22 such that the plurality of telescopic bars 22 may extend or retract synchronously, which further facilitates the use of the positing device for drilling. Meanwhile, there may be alternatively provided a plurality of interconnecting mechanisms, each of which drivingly connects part of the telescopic bars 22 of the plurality of telescopic bars 22, respectively. For example, there are totally provided two interconnecting mechanisms each of which drivingly connects two telescopic bars 22, respectively, such that two of the plurality of telescopic bars 22 are extended or retracted synchronously by one of the interconnecting mechanisms, while another two of the plurality of telescopic bars 22 are extended or retracted synchronously by another one of the interconnecting mechanisms, which facilitates the use of the positioning device for drilling.

In certain embodiments of the disclosure, all of the telescopic bars may alternatively be drivingly connected by the same one interconnecting mechanism such that all of the telescopic bars 22 may be extended or retracted synchronously.

Figure 5:
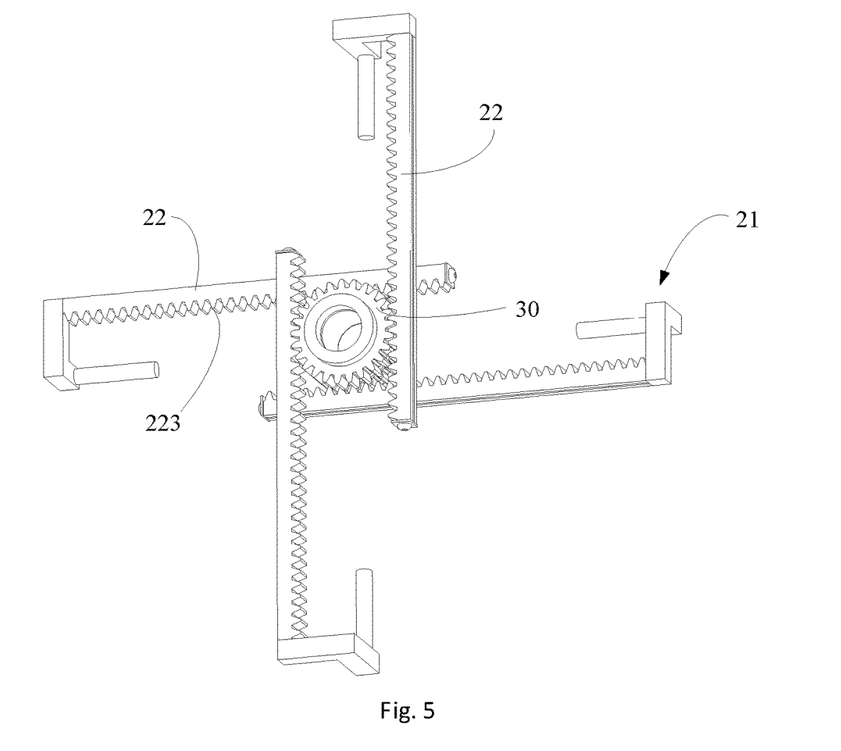
FIG. 5 is a schematic partial structural view showing cooperation of telescopic bars and an interconnecting mechanism according to an embodiment of the disclosure.

FIG. 5 is a schematic view of partial structure showing cooperation of the telescopic bars and the interconnecting mechanisms according to an embodiment of the disclosure. As shown in FIG. 5, each of the interconnecting mechanisms may include an interconnecting gear 30 which is rotatably provided at the positioning base 10. The telescopic bars 22 drivingly connected with the interconnecting mechanisms are provided thereon with racks 223 extending along respective extending-retracting directions, the rack 223 and the gear 10 are engaged. When a telescopic bar 22 is pulled or pushed in the extending-retracting direction, the telescopic bar 22 as pulled or pushed may drive via the interconnecting gear 30 another telescopic bar 22 drivingly connected therewith, allowing the another telescopic bar 22 to extend or retract together.

In the current embodiment, two telescopic bars 22 drivingly connected by the same one interconnecting gear 30 have the same extending-retracting direction, i.e., they retract inward simultaneously and extend outward simultaneously. In other embodiments, two telescopic bars 22 drivingly connected by the same one interconnecting gear 30 may alternatively have their extending-retracting directions to form an angle.

Optionally, the interconnecting gear may have a thickness greater than that of the rack. Here, the thickness of the interconnecting gear refers to the axial dimension of the interconnecting gear, and the thickness of the rack refers to the dimension of the rack in the axial direction of the interconnecting gear when the rack is engaged with the interconnecting gear.

Figure 6:
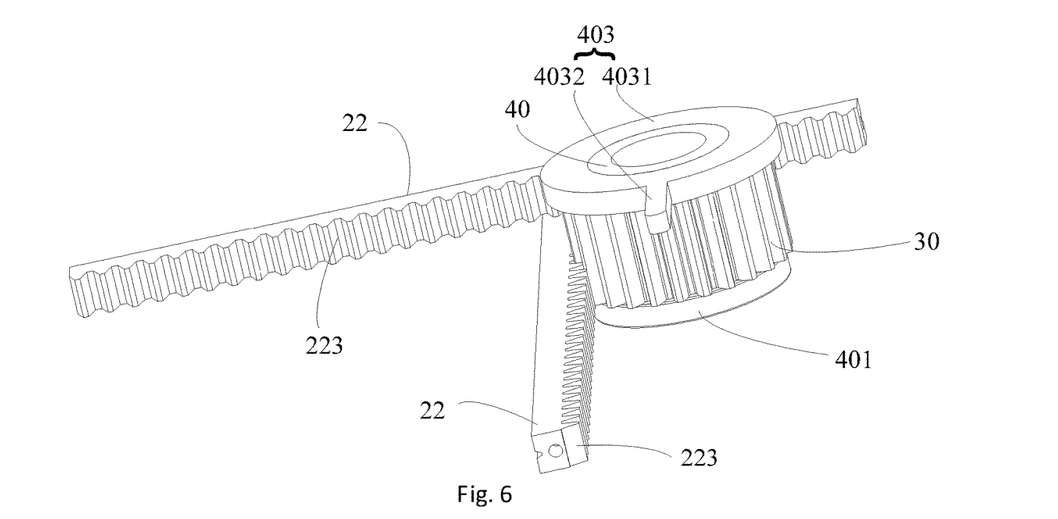
FIG. 6 is a schematic view showing cooperation of an interconnecting gear and racks according to an embodiment of the disclosure.

FIG. 6 is a schematic view showing the cooperation of an interconnecting gear and racks according to an embodiment of the disclosure. As shown in FIG. 6, the thickness of the interconnecting gear 30 may be two times larger than that of the racks 223, thereby facilitating driving connection with a plurality of telescopic bars 22 by single one interconnecting gear 30. Exemplarily, there are three telescopic bars 22 drivingly connected with the interconnecting gear 30. For simplicity of illustration, one telescoping bar provided coplanarly with one of the two bars shown in FIG. 6 is omitted. The three telescopic bars 22 are arranged in two parallel spaced planes, two of which are in the same one plane. In other embodiments, the interconnecting gear 30 may alternatively be drivingly connected with more number of telescopic bars 22 which are arranged in a plurality of spaced parallel planes.

Since the racks 223 of the plurality of telescoping bars 22 are all engaged with single one interconnecting gear 30, the plurality of telescoping bars 22 may not only extend or retract synchronously, but also have the same changing value in length within the same time period, such that the positioning through hole 10*a* may always be aligned with the same one position on the workpiece when the abutting parts 21 of the interconnecting telescopic bars 22 abut against the workpiece. Once the difference in length between the interconnecting telescopic bars 22 is changed, the position with which the positioning through hole 10*a* is aligned may be changed, thereby facilitating position of a drill bit and improving positioning accuracy.

Furthermore, the telescopic bars 22 may additionally be provided thereon with scales arranged in the extending-retracting direction to facilitate measurement of length of the telescopic bars 22 beyond the positioning base 10 and of the difference in length between different telescopic bars 22.

In another embodiment of the disclosure, the positioning device for drilling may include a plurality of interconnecting mechanisms each of which includes one interconnecting gear 20. All the interconnecting gears 30 of the respective interconnecting mechanisms are arranged in the same one axis, which may make the structure of the positioning device for drilling more compact and help reduce the volume of the positioning device for drilling.

For this purpose, the positioning device for drilling may include N interconnecting gears 30 each of which is engaged with the racks 223 of the telescopic bars 22 of two clamping assemblies 20 and in the same direction as the extending-retracting direction of the telescopic bars 22 of the two clamping assemblies 20 driving connected with the same interconnecting gear 30. The included angle between extending-retracting directions of telescoping bars 22 of any two adjacent clamping assemblies 20 is 180°/N, where N is a positive integer. Each interconnecting gear 30 is drivingly connected with two telescoping bars 22. The included angles between adjacent telescoping bars 22 are all equal to each other, thereby making a more even distribution of the telescoping bars 22 and facilitating installation of the positioning device for drilling onto a column-like workpiece. N may have a value within the range of 2-4. If there are too many interconnecting gears, the volume of the positioning device for drilling will be increased.

Figure 7:
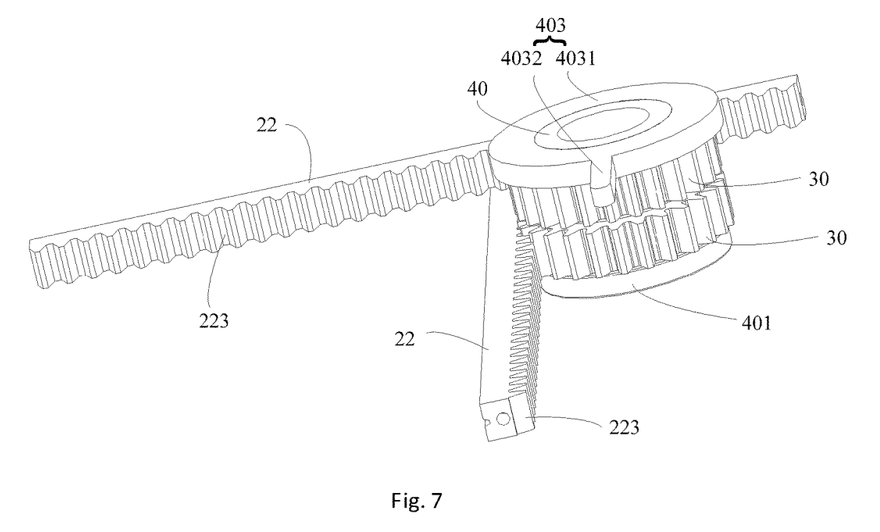
FIG. 7 is an enlarged partial view of FIG. 5.

FIG. 7 is an enlarged partial view of FIG. 5. With reference to both FIGS. 5 and 7, the positioning devices for drilling may include two interconnecting gears 30 which may be arranged coaxially on a gear shaft 40. Each interconnecting gear 30 is drivingly connected with telescopic bars 22 of two clamping assemblies 20. The included angle between extending-retracting directions of any two adjacent telescopic bars 22 is 90°, which may facilitate secure installation of the positioning device for drilling onto a workpiece with a rectangular or regular octagonal section.

It should be noted that the N interconnecting gears 30 may be provided rotatably with respect to each other on the positioning base 10, such that the interconnecting gears 30 each may rotate independently.

In the embodiments as shown in FIGS. 6 and 7, the positioning device for drilling may additionally include a locking nut 403 which is threadedly connected with the gear shaft 40, and a stop collar 401 which is co-axially securely connected to the gear shaft 40. The interconnecting gear 30 is positioned between the locking nut 403 and the stop collar 401. The locking nut 403 and the stop collar 401 may form a locking mechanism. The interconnecting gear 30 may be clamped with the locking nut 403 and the stop collar 401 by screwing up the locking nut 403, such that the interconnecting gear 30 cannot rotate, thereby locking the telescoping bars 22 to prevent them from being loosened during drilling. In comparison with the locking mechanism for the positioning device for drilling as shown in FIG. 4, the positioning device for drilling as shown in FIG. 7 may lock all of the telescopic bars 22 at the same time, which facilitates operation.

The locking nut 403 may include a nut body 4031 which is fitted around the gear shaft 40, and a pushing bar 4032 which is provided on the nut body 4031. Providing the push bar 4032 on the nut body 4031 may facilitate manually screwing or unscrewing the locking nut 403 and facilitating operation by workers.

The pushing bars 4032 may radially extend outward from the nut body 4031, which further facilitates twisting of the locking nut 403.

It should be noted that only the end of the gear shaft 40 for connecting with the locking nut is provide with thread such that the interconnecting gear 30 may be easily arranged and rotate more stably.

Figure 8:
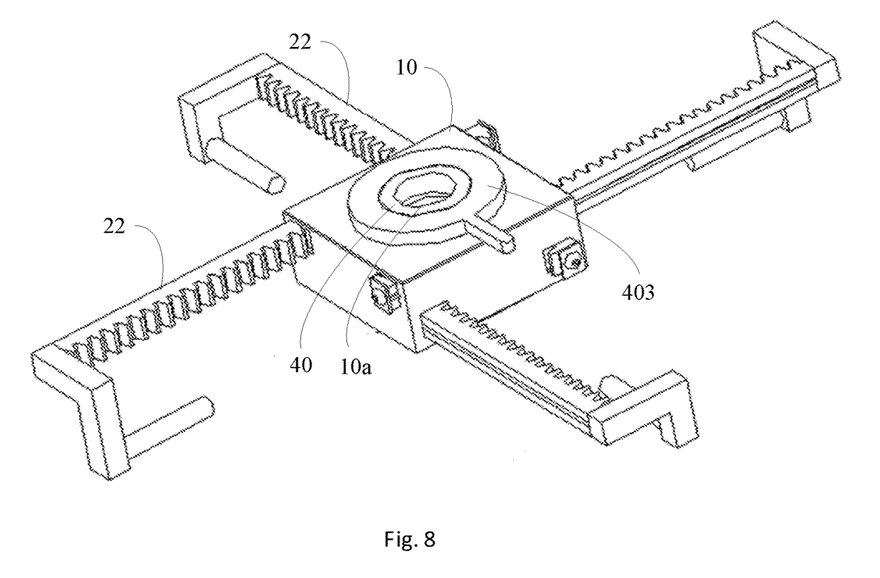
FIG. 8 is a schematic structural view of another positioning device for drilling according to an embodiment of the disclosure.

FIG. 8 is a schematic structural view of another positioning device for drilling according to an embodiment of the disclosure. With reference to both FIGS. 7 and 8, the interconnecting gear 30 may be installed on the positioning base 10 by the gear shaft 40. The gear shaft 40 is provided to coaxial with the positioning through hole 10*a* which runs through the gear shaft 40, which facilitates further reducing of the volume of the positioning base 10, thereby reducing the volume of the positioning device for drilling.

The interconnecting gears 30 may be moveably connected with the gear shaft 40. This may allow different interconnecting gears 30 to rotate independently with respect to each other such that the telescoping bars engaged with the same interconnecting gear 30 extend or retract synchronously, while the telescopic bars engaged with different interconnecting gears 30 may extend or retract independently, facilitating clamping of the positioning device for drilling on the workpiece. The gear shaft 40 may be fixed on the positioning base.

Optionally, the positioning device for drilling may include a plurality of gear shafts 40 which have same outer diameters but different inner diameters. The positioning base 10 is provided with a gear shaft 40, by replacing which with one having a different inner diameter for the positioning base 10, thus the positioning device for drilling may be used to position drill bits of different diameters.

Take the positioning devices for drilling as shown in FIGS. 7 and 8 as examples, the gear shaft 40 may be replaced by unscrewing the locking nut 403, pressing the gear shaft 40 from the end for installing the lock nut 403 towards the other end to move the gear shaft 40 axially, and removing the gear shaft 40 from the positioning base 10, then inserting another gear shaft 40 into the positioning base 10 and again screwing the locking nut 403.

Figure 9:
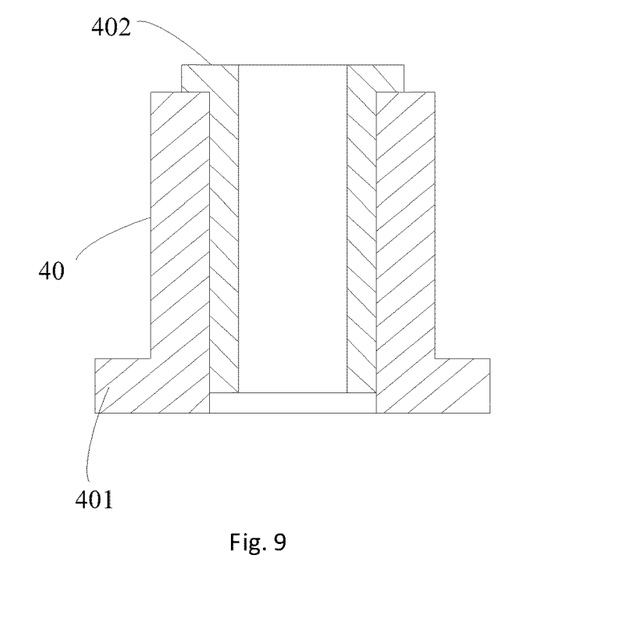
FIG. 9 is an enlarged schematic view of a gear shaft and a positioning sleeve according to an embodiment of the disclosure.

FIG. 9 is an enlarged schematic view of a gear shaft and a positioning sleeve according to an embodiment of the disclosure. As shown in FIG. 9, the positioning device for drilling may also include a plurality of positioning sleeves 402, which have different inner diameters and outer diameters all equal to the diameter of the positioning through hole 10*a*, such that drill bits of different diameters may be positioned by inserting positioning sleeves of different inner diameters into the positioning through hole 10a, and the positioning sleeves may be replaced easily.

As shown in FIG. 9, the positioning sleeve 402 is in form of circular cylinder with one end thereof being provided with a flange extending radially outward. The provision of the flange may facilitate detachment of the positioning sleeve 402.

Figure 10:
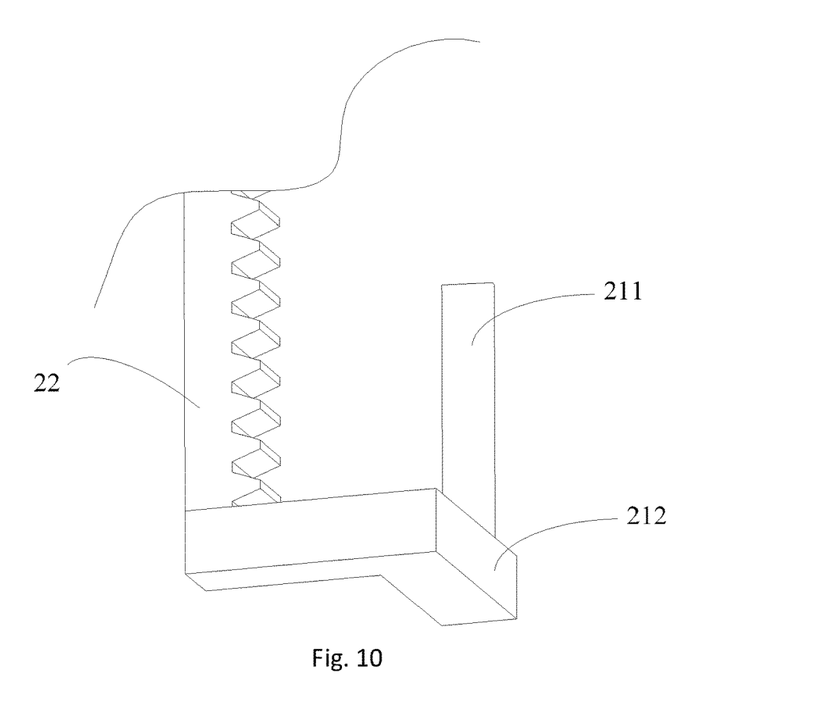
FIG. 10 is an enlarged schematic view of an abutting part of a positioning device for drilling according to an embodiment of the disclosure.

FIG. 10 is an enlarged schematic view of an abutting part of a positioning device for drilling according to an embodiment of the disclosure. As shown in FIG. 10, the abutting part 21 may include an abutting bar 211 provided to be parallel with and spaced from a telescoping bar 22. The abutting bar 211 is provided, by way of an installing base 212, at an end of the telescoping bar 22 away from the positioning base 10. Provision of the installing base 212 may facilitate the provision of the abutting bar 211.

Exemplarily, the installing base 212 may be a plate member in shape of "L". Both the telescoping bar 22 and the abutting bar 211 are perpendicularly connected with the installing base 212. The installing base 212 may be provided such that the abutting bar 211 may be not coplanar with a plane of the positioning base 10 for contacting the workpiece, which facilitates abutting of the abutting bar against the surface of the workpiece.

It should be noted that the shape of the installing base shown in FIG. 10 is only for illustration, and is not intended to limit the disclosure.

Abutting parts 21 of a plurality of clamping assemblies may all be in the same one plane. In particular, abutting bars 211 of a plurality of abutting parts 21 may be provided in the same one plane, facilitating abutment against a workpiece in the same one plane, making forces applied among the plurality of abutting bars 212 more balanced, and making the positioning device for drilling be installed on the workpiece more stably. It is possible to provide on the respective telescopic bars 22 installing bases 212 having same or different sizes in the directions perpendicular to the extending-retracting directions of the telescopic bars 22 such that abutting bars 211 of different telescopic bars 22 may be in the same one plane.

The portion of the abutting bar 211 between the installing base 212 and the positioning base 10 is adjustable in length. Since even the workpieces for the same one product or part may have slight differences in size, it would arise that the abutting parts 21 of some of the synchronously extending or retracting telescopic bars 22 have abutted against the surface of the workpiece while the abutting parts 21 of the other synchronously extending or retracting telescopic bars 22 have not yet. In such a case, all of the abutting parts may be allowed to abut against the surface of the workpiece by adjusting the length of the abutting bars 211 and finely adjusting the distances between the abutting parts 21 and the surface of the workpiece, thereby improving the stability of installing the positioning device for drilling.

Figure 11:
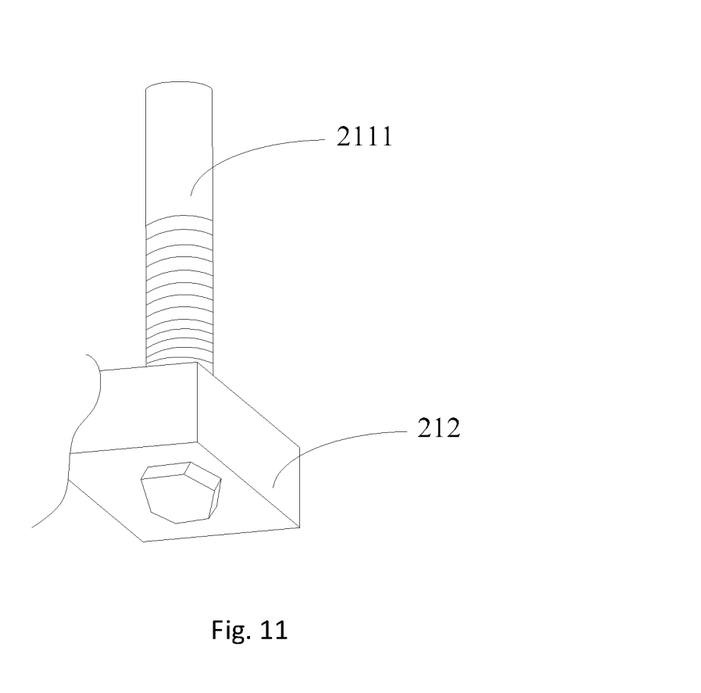
FIG. 11 is a schematic view of an assembled abutting bar according to an embodiment of the disclosure.

FIG. 11 is a schematic view of an assembled abutting bar according to an embodiment of the disclosure. As shown in FIG. 11, the abutting bar 211 may include an adjusting threaded bar 211 which is threadly connected with the installing base 212 such that the abutting bar 211 may be allowed to abut against the surface of the workpiece by twisting the adjusting threaded bar 2111 to change the length of the abutting bar 211 between the installing base 212 and the positing base 10.

The aforesaid description only involves preferred embodiments of the disclosure and is not intended to limit the disclosure. Any alteration, equivalent substitution and modification and the like, when falling within the spirit and principle of the disclosure, should be contained within the protective scope of the disclosure.

What is claimed is:

1. A positioning device for drilling, comprising:
   a positioning base provided with a positioning through hole,
   a plurality of clamping assemblies provided on the positioning base and circumferentially spaced around a central axis, as center, of the positioning through hole, wherein each of the clamping assemblies comprises an abutting part, a distance between the abutting part and the central axis of the positioning through hole is adjustable, wherein each of the clamping assemblies comprises a telescopic bar which has one end provided at the positioning base, and another end on which the abutting part is provided, and
   at least one interconnecting mechanism comprising an interconnecting gear which is rotatably provided at the positioning base through a hole of the positioning base, the telescopic bars are provided with racks extending along respective extending-retracting directions, the rack and the interconnecting gear is engaged.

2. The positioning device for drilling according to claim 1, further comprising a plurality of interconnecting mechanisms, each comprising one interconnecting gear, wherein all of the interconnecting gears are arranged on a same axis.

3. The positioning device for drilling according to claim 1, further comprising N interconnecting gears, each engaged with the racks of the telescopic bars of two of the clamping assemblies, and wherein the extending-retracting directions of the telescopic bars of the two clamping assemblies driving connected with same one of the interconnecting gears are in the same direction, wherein an included angle between extending-retracting directions of telescoping bars of any two adjacent ones of the clamping assemblies is 180°/N, where N is a positive integer.

4. The positioning device for drilling according to claim 3, wherein the positioning device further comprises a locking mechanism for locking a plurality of the telescopic bars.

5. The positioning device for drilling according to claim 1, wherein the interconnecting gear is installed on the positioning base by a gear shaft which is provided to be coaxial with the positioning through hole, and wherein the positioning through hole runs through the gear shaft.

6. The positioning device for drilling according to claim 5, wherein the interconnecting gear is moveably connected with the gear shaft.

7. The positioning device for drilling according to claim 5, wherein the positioning device further comprises a locking mechanism for locking a plurality of the telescopic bars.

8. The positioning device for drilling according to claim 1, wherein the positioning device further comprises a locking mechanism for locking a plurality of the telescopic bars.

9. The positioning device for drilling according to claim 8, wherein the locking mechanism comprises:
   a locking nut, threadedly connected with the gear shaft, and
   a stop collar, co-axially securely connected to the gear shaft,
   wherein the interconnecting gear is positioned between the locking nut and the stop collar.

10. The positioning device for drilling according to claim 9, wherein the locking nut comprises:
    a nut body, fitted around the gear shaft, and
    a pushing bar, provided on the nut body.

11. The positioning device for drilling according to claim 1, wherein the positioning device further comprises a locking mechanism for locking a plurality of the telescopic bars.

12. The positioning device for drilling according to claim 1, wherein in the extending direction of the central axis, the abutting parts of the clamping assemblies each are disposed at same side of the positioning base.

13. The positioning device for drilling according to claim 12, wherein the abutting parts of the plurality of clamping assemblies are all in same one plane.

14. The positioning device for drilling according to claim 13, wherein the abutting part comprises an abutting bar provided to be parallel with and spaced from the telescoping bar, and is provided, by way of an installing base, at an end of the telescoping bar away from the positioning base, and wherein a portion of the abutting bar between the installing base and the positioning base is adjustable in length.

15. The positioning device for drilling according to claim 1, wherein in the extending direction of the central axis, the abutting parts of the clamping assemblies each are disposed at same side of the positioning base.

16. The positioning device for drilling according to claim 1, wherein in the extending direction of the central axis, the abutting parts of the clamping assemblies each are disposed at same side of the positioning base.

17. The positioning device for drilling according to claim 1, further comprising a plurality of positioning sleeves, having different inner diameters, and outer diameters all equal to the diameter of the positioning through hole.

* * * * *